(12) United States Patent
Hudman

(10) Patent No.: US 9,805,454 B2
(45) Date of Patent: Oct. 31, 2017

(54) WIDE FIELD-OF-VIEW DEPTH IMAGING

(71) Applicant: MICROSOFT TECHNOLOGY LICENSING, LLC, Redmond, WA (US)

(72) Inventor: Joshua Mark Hudman, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 466 days.

(21) Appl. No.: 14/332,258

(22) Filed: Jul. 15, 2014

(65) Prior Publication Data
US 2016/0019684 A1    Jan. 21, 2016

(51) Int. Cl.
| | |
|---|---|
| G06T 7/00 | (2017.01) |
| G02B 13/08 | (2006.01) |
| H04N 7/18 | (2006.01) |
| G01S 17/02 | (2006.01) |
| G01S 17/89 | (2006.01) |
| G01S 7/481 | (2006.01) |
| G06F 3/01 | (2006.01) |
| G01S 7/48 | (2006.01) |

(52) U.S. Cl.
CPC .......... *G06T 7/0004* (2013.01); *G01S 7/4816* (2013.01); *G01S 17/023* (2013.01); *G01S 17/89* (2013.01); *G02B 13/08* (2013.01); *G06F 3/017* (2013.01); *H04N 7/183* (2013.01); *G01S 7/4808* (2013.01)

(58) Field of Classification Search
CPC ..... G06T 7/0004; G06F 3/017; G01S 17/023; G01S 17/89; G01S 7/4808; G01S 7/4816; G02B 13/08; H04N 7/183
See application file for complete search history.

(56) References Cited

U.S. PATENT DOCUMENTS

| | | | | |
|---|---|---|---|---|
| 6,088,156 A | * | 7/2000 | Kato | G02B 7/32 359/422 |
| 6,327,440 B1 | * | 12/2001 | Taniguchi | G03B 1/50 396/436 |
| 6,424,465 B2 | * | 7/2002 | Suzuki | 359/554 |

(Continued)

OTHER PUBLICATIONS

Kwon, G. et al., "Automatic Guideline Generation for Parking Assistance System Based on On-screen Display", In Proceedings of the IEEE 13th International Symposium on Consumer Electronics, May 25, 2009, 2 pages.

(Continued)

*Primary Examiner* — Sath V Perungavoor
*Assistant Examiner* — Philip Dang
(74) *Attorney, Agent, or Firm* — Alleman Hall Creasman & Tuttle LLP

(57) ABSTRACT

A machine-vision system includes a modulated light source, an imaging pixel array, and a lens system. The modulated light source is configured to project light onto a subject. The imaging pixel array is configured to receive the light reflected from a locus of the subject and indicate distance to the locus. The lens system is configured to receive the light reflected from the subject and refract such light onto the imaging pixel array. The focal length of the lens system decreases with increasing angle of observation relative to a shared optical axis of the lens system and the imaging pixel array.

20 Claims, 12 Drawing Sheets

(56) References Cited

U.S. PATENT DOCUMENTS

| | | | | |
|---|---|---|---|---|
| 6,426,841 | B1* | 7/2002 | Araki | G02B 15/14 359/431 |
| 6,459,530 | B2* | 10/2002 | Nanba | G02B 15/16 359/365 |
| 7,206,136 | B2* | 4/2007 | Labaziewicz | H04N 5/225 348/207.99 |
| 7,525,593 | B2* | 4/2009 | Ichikawa | G01D 5/347 348/187 |
| 7,535,654 | B2* | 5/2009 | Ohashi | G02B 15/173 359/687 |
| 8,270,095 | B2* | 9/2012 | Matsusaka | G02B 15/177 359/682 |
| 8,335,390 | B2* | 12/2012 | Li | G06T 5/002 348/345 |
| 8,351,120 | B2* | 1/2013 | Deng | G02B 27/0012 348/241 |
| 8,384,767 | B2* | 2/2013 | Iwasaki | H04N 13/0239 348/42 |
| 8,488,258 | B2 | 7/2013 | Shabtay et al. | |
| 8,558,873 | B2* | 10/2013 | McEldowney | G01B 11/2513 348/46 |
| 8,576,276 | B2* | 11/2013 | Bar-Zeev | G02B 27/017 345/8 |
| 8,670,029 | B2* | 3/2014 | McEldowney | G02B 5/1895 348/121 |
| 8,704,916 | B2* | 4/2014 | Imai | H04N 5/23212 348/239 |
| 8,719,317 | B1* | 5/2014 | Crain | H04L 67/12 707/736 |
| 8,767,014 | B2* | 7/2014 | Vaught | G02B 27/017 345/633 |
| 2003/0168597 | A1* | 9/2003 | Webb | G02B 5/3091 250/330 |
| 2005/0140940 | A1 | 6/2005 | Eckhardt | |
| 2006/0163446 | A1* | 7/2006 | Guyer | G01S 3/781 250/203.1 |
| 2008/0316609 | A1* | 12/2008 | Robinson | G02B 13/06 359/664 |
| 2010/0060551 | A1* | 3/2010 | Sugiyama | G02B 27/0172 345/8 |
| 2011/0199482 | A1* | 8/2011 | Morgan | H04N 5/2251 348/143 |
| 2012/0147143 | A1* | 6/2012 | Park | G02B 7/32 348/46 |
| 2012/0169848 | A1 | 7/2012 | Bae et al. | |
| 2012/0229611 | A1* | 9/2012 | Pellman | G03B 15/05 348/49 |
| 2013/0222550 | A1 | 8/2013 | Choi et al. | |
| 2013/0250160 | A1* | 9/2013 | Neil | G02B 15/14 348/345 |
| 2013/0257908 | A1* | 10/2013 | Ota | G06T 19/006 345/633 |
| 2013/0307939 | A1* | 11/2013 | May | G03B 17/565 348/49 |
| 2013/0322697 | A1* | 12/2013 | Grindstaff | G06T 7/2033 382/107 |
| 2014/0055659 | A1* | 2/2014 | Iwamoto | G02B 15/14 348/335 |
| 2014/0098194 | A1* | 4/2014 | Goma | G06T 7/002 348/47 |
| 2014/0153118 | A1* | 6/2014 | Onozaki | G02B 13/06 359/795 |
| 2014/0168378 | A1* | 6/2014 | Hall | H04N 13/0246 348/47 |

OTHER PUBLICATIONS

ISA European Patent Office, International Search Report and Written Opinion issued in Application No. PCT/US2015/039631, dated Oct. 14, 2015, WIPO, 12 pages.

Catrysse, et al., "QE Reduction due to Pixel Vignetting in CMOS Image Sensors", In Electronic Imaging of International Society for Optics and Photonics, May, 2005, 11 pages.

Zheng, et al., "Single-Image Vignetting Correction from Gradient Distribution Symmetries", In IEEE Transactions on Pattern Analysis and Machine Intelligence, vol. 35, Issue 6, Jun. 2013, 16 pages.

Kumler, et al., "Fisheye Lens Designs and Their Relative Performance", In Proceedings SPIE Current Developments in Lens Design and Optical Systems Engineering, Oct. 24, 2000, 10 pages.

Curatu, George, "Design and Fabrication of Low-Cost Thermal Imaging Optics Using Precision Chalcogenide Glass Molding", In Proceedings of Optical Engineering+ Applications, International Society for Optics and Photonics, Aug. 2008, 7 pages.

IPEA European Patent Office, Second Written Opinion issued in PCT Application No. PCT/US2015/039631, dated Jun. 1, 2016, WIPO, 8 pages.

IPEA European Patent Office, International Preliminary Report on Patentability Issued in PCT Application No. PCT/US2015/039631, dated Oct. 10, 2016, WIPO, 6 pages.

* cited by examiner

WIDE FIELD-OF-VIEW DEPTH IMAGING

BACKGROUND

Depth imaging is used in many applications—more so in recent years due to advances in time-of-flight (TOF) depth-imaging technology. Improvements in TOF-sensor arrays, in particular, have made accurate, low-cost depth imaging accessible to consumer markets. Nevertheless, various issues remain for depth imaging in consumer electronics, where constraints related to size, weight, cost, and/or power consumption combine with challenges related to image acquisition.

SUMMARY

One embodiment of this disclosure provides a machine-vision system comprising a modulated light source, an imaging pixel array, and a lens system. The modulated light source is configured to project light onto a subject. The imaging pixel array is configured to receive the light reflected from a locus of the subject and indicate distance to the locus. The lens system is configured to receive the light reflected from the subject and refract such light onto the imaging pixel array. The focal length of the lens system decreases with increasing angle of observation relative to a shared optical axis of the lens system and the imaging pixel array.

This summary is provided to introduce a selection of concepts in simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
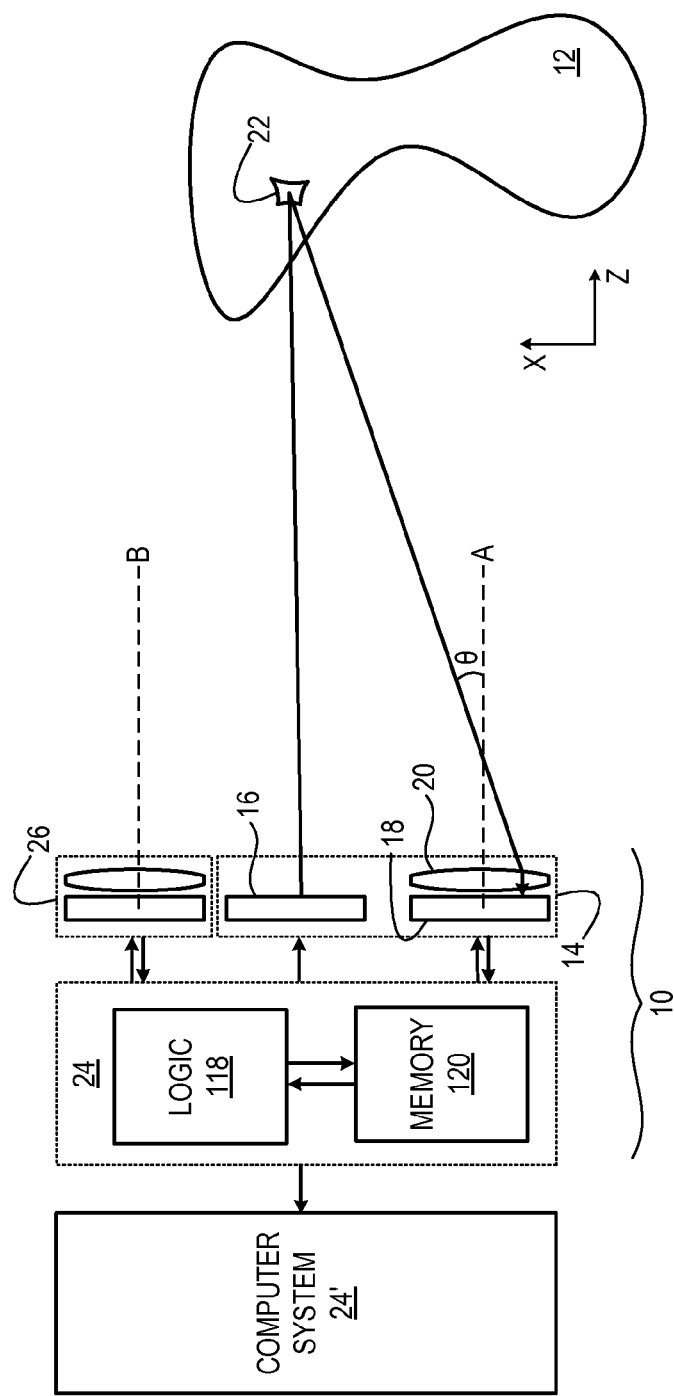
FIG. 1 is a schematic plan view showing aspects of an example machine-vision system.

Aspects of this disclosure will now be described by example and with reference to the illustrated embodiments listed above. Components, process steps, and other elements that may be substantially the same in one or more embodiments are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example machine-vision system 10 configured to image a subject 12. In the illustrated embodiment, the machine-vision system includes a time-of-flight depth camera 14. In some configurations, the depth camera may be positioned from 0.1 to 5 meters away from the subject, though other depth ranges are contemplated as well. The machine-vision system disclosed herein is capable of imaging a broad range of subjects, from simple, static topologies to complex, moving subjects such as human beings. In some scenarios, an imaged subject may include both foreground and background portions and constitute an entire scene.

As shown in FIG. 1, depth camera 14 includes a modulated light source 16, an imaging pixel array 18, and an objective lens system 20. The depth camera may also include various other components, such as wavelength filter (not shown in the drawings) which may be set in front of the imaging pixel array or the objective lens system.

Modulated light source 16 is configured to project onto subject 12 modulated probe light of an infrared (IR) or near-infrared (NIR) wavelength band. The objective lens system, accordingly, is preferably transparent in an IR or NIR band where the modulated light source emits. The probe light may be modulated temporally according to any suitable modulation waveform, including, but not limited to a pulsed or sinusoidal waveform. The nature of the modulated light source may differ in the various embodiments of this disclosure. In some embodiments, the modulated light source may include a modulated laser, such as an IR or NIR laser. More particular examples include an edge emitting laser or vertical-cavity surface-emitting laser (VCSEL). In other embodiments, the modulated light source may include one or more high-power light-emitting diodes (LEDs).

Objective lens system 20 is configured to receive the light reflected from subject 12 and refract such light onto imaging pixel array 18. In some embodiments, the objective lens system may provide a relatively high FOV, as further described herein. In the illustrated embodiment, the lens system and imaging pixel array share a common optical axis A, which is normal to the imaging pixel array and passes through a center of the lens system. The objective lens system may be a compound lens system in some embodiments. In more particular configurations, the objective lens system may include five or six refractive elements.

Imaging pixel array 18 includes an array of depth-sensing pixels, each configured to receive at least some of the modulated probe light reflected back from a corresponding locus 22 of subject 12. Each pixel of the array outputs information useable to determine the distance from depth camera 14 to the subject locus imaged onto that pixel.

Controller 24 of machine-vision system 10 is operatively coupled to modulated light source 16 and to imaging pixel array 18, and is configured to compute the distance to locus 22. The controller includes logic that provides synchronized, modulated drive signals to light source 16 and to imaging pixel array 18, to synchronize the operation of these components. In particular, the controller logic modulates emission from the light source while synchronously biasing the electrodes of the imaging pixel array. The controller is also configured to read the output from each pixel of the imaging pixel array to enable computation of a depth map of subject 12. As used herein, the terms 'depth map' or 'depth image' refer to an array of pixels registered to corresponding loci $(X_i, Y_i)$ of an imaged subject, with a depth value $Z_i$ indicating, for each pixel, the depth of the corresponding locus. 'Depth' is defined as a coordinate parallel to the optical axis A of the depth camera, which increases with increasing distance from the depth camera. In some embodiments, repeated depth imaging may be used to assemble a time-resolved series of depth maps—i.e., depth video.

In the illustrated embodiment, machine-vision system 10 also includes a flat-image camera 26. Like depth camera 14, the flat-image camera also includes an imaging pixel array and a high-FOV objective lens system. In some embodiments, the lens system of the flat-image camera may have a fixed focal length. The flat-image camera may image visible light from subject 12 in a plurality of channels—e.g., red, green, blue, etc.—mapping the imaged color channels to its imaging pixel array. Alternatively, the flat-image camera may be a monochromatic camera, which images the subject in grayscale. Color or brightness values for all of the pixels exposed in the flat-image camera constitute collectively a 2D digital image. In some embodiments, depth and flat-image cameras of machine-vision system 10 may have the same resolutions. Even when the resolutions differ, the pixels of the flat-image camera may be registered to those of the depth camera. In this way, concurrent brightness and depth information may be assessed for each locus 22 of subject 12.

In the illustrated embodiment, flat-image camera 26 is aligned along an optical axis B, which is parallel to the optical axis A of depth camera 14. In another embodiment, a beam-splitting optic may be arranged optically upstream of the depth camera and the flat-image camera, and configured so that the depth camera and the flat-image camera receive light from subject 12 along the same optical axis. In these and other embodiments, any location (X', Y') in the FOV of one of the cameras may be related to a location (X", Y") in the FOV of the other camera via an appropriate coordinate transform, based on the geometric configuration of the machine-vision system. Accordingly, corresponding images from depth camera 14 and from flat-image camera 26 may be co-registered to each other.

Figure 2:
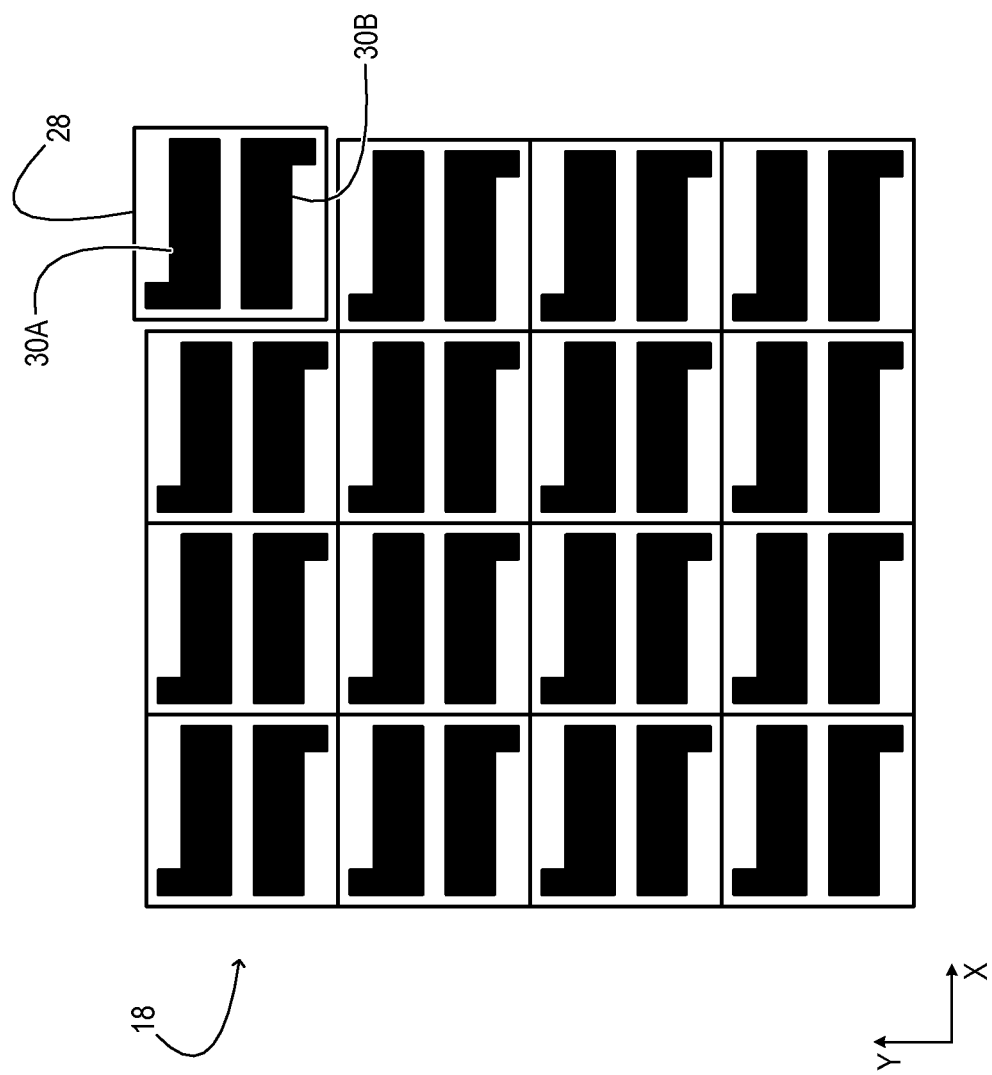
FIG. 2 shows aspects of an example imaging pixel array of a time-of-flight depth camera of a machine-vision system.

FIG. 2 shows aspects of imaging pixel array 18 of the depth camera 14 in one, non-limiting embodiment. In particular, the drawing shows an array of depth-sensing pixels 28. Each pixel includes a first pixel element 30A, an adjacent second pixel element 30B, and may also include additional pixel elements not shown in the drawing. Each pixel element may include one or more finger gates, transfer gates and/or collection nodes epitaxially formed on a semiconductor substrate. The pixel elements of each pixel may be addressed so as to provide two or more integration periods synchronized to the emission from the modulated light source. The integration periods may differ in phase and/or total integration time. Based on the relative amount of differential (and in some embodiments common mode) charge accumulated on the pixel elements during the different integration periods, the distance out to a corresponding locus of the subject may be assessed. In some embodiments, modulated light source 16 and first pixel element 30A are energized concurrently, while second pixel element 30B is energized 180° out of phase with respect to the first pixel element. Based on the relative amount of charge accumulated on the first and second pixel elements, the phase angle of the reflected light pulse received in the imaging pixel array is computed versus the probe modulation. From that phase angle, the distance out to the corresponding locus may be assessed.

While the above description emphasizes one type of time-of-flight depth imaging, the nature of depth cameras 14 may differ in the various embodiments of this disclosure. In some embodiments, brightness or color data from two stereoscopically oriented imaging pixel arrays in a depth camera may be co-registered and used to construct a depth map. In some embodiments, a depth camera may be configured to project onto the subject a structured infrared illumination pattern comprising numerous discrete features—e.g., lines or dots. An imaging pixel array in the depth camera may be configured to image the structured illumination reflected back from the subject. Based on the spacings between adjacent features in the various regions of the imaged subject, a depth map of the subject may be constructed. In some embodiments, therefore, the modulated light source may be a spatially—rather than temporally—modulated light source. There, the imaging pixel array indicates distance to each locus by revealing the separation between adjacent illuminated areas of the subject.

The amount of uncertainty in any depth measurement is a sensitive function of the signal-to-noise ratio in channels corresponding to the depth-sensing pixel elements of imaging pixel array 18. One option to increase signal is to boost the power of modulated light source 16. This option, however, requires additional power and a more expensive light source. Another option is to increase the collection efficiency of depth camera 14. Typically, the collection efficiency of any camera is limited by the aperture size of its objective lens system. The aperture size can be increased by using lenses of larger diameter, but this approach will also increase the focal length of the lens system, which is undesirable for compact depth imaging. Assuming that objective lens system 20 has the maximum tolerable focal length for a given camera configuration, the overall aperture size is controlled by the f/N parameter of the lens system: using the minimal value of the 'f-stop' N will ensure the maximum aperture size for a given focal length f.

Figure 3B:
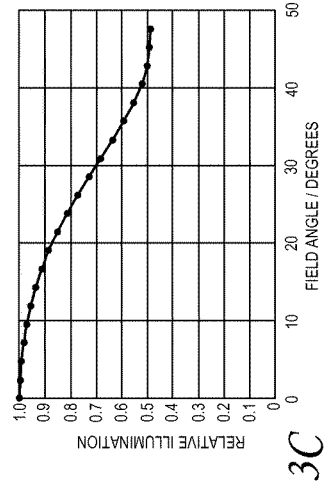
FIG. 3B is a graph showing the effective aperture stop as a function of field angle for an example lens system.
Figure 3C:
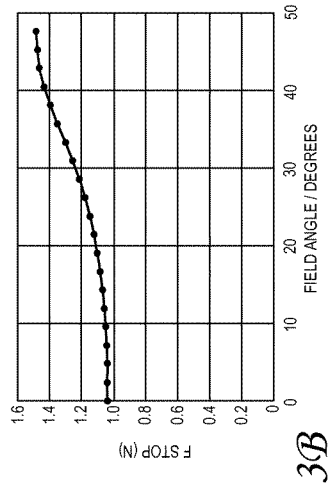
FIG. 3C is a graph showing relative illumination as a function of field angle for an example lens system.
Figure 3A:
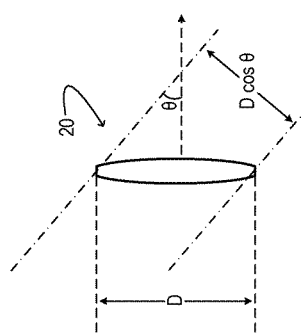
FIG. 3A shows the effect of field angle on the effective aperture diameter of a lens system.

Turning now to FIG. 3A, it is possible to engineer an objective lens system 20 having an aperture diameter of f/1.0 or greater, as measured along optical axis A. However, this and every other lens system will exhibit some degree of aperture fall off at larger field angles θ. Typically, the effective f-stop of a lens aperture increases as 1/cos θ, as shown in FIG. 3B. Thus, the aperture diameter may fall from f/1.0 at the center of the field to f/1.48 at large field angles. Consequently, the power flux through the aperture may decrease as $1/\cos^2 \theta$, as shown in FIG. 3C. In a TOF measurement, this loss of power at higher field angles translates to a steep increase in the error bar of the Z coordinate corresponding to the observed locus.

The analogous effect in flat image acquisition is that an acquired image appears darker at the edges—i.e., vignetted. Various remedies have been applied to correct the vignetting problem in 2D imaging. In particular, software-based brightness enhancement may be applied at the periphery of a flat image. The small errors associated with this method may go unnoticed, because, for a well-composed image, the observer is more concerned with subject matter presented at low field angles. Another remedy for 2D image acquisition at high fields of view is to take multiple exposures with different integration times and digitally combine the resulting images. Specifically, pixels corresponding to high-field portions of the image may derive from a longer exposure than pixels corresponding to low-field portions.

The above remedies provide little help in time-of-flight depth imaging, however, especially when the acquired depth image is to be used as input data for a computer system. Here it cannot be assumed that subject matter at high field is less important than the subject matter at low field. Moreover, the integration time in a time-of-flight measurement is not an adjustable parameter, but a function of the intrinsic depth scale of the subject.

Figure 3D:
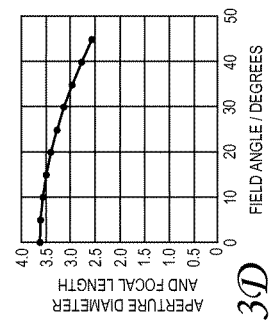
FIG. 3D is a graph showing focal length and effective aperture diameter for an example lens system in accordance with an embodiment of this disclosure.

Restating the problem at hand, if objective lens system 20 maintains a constant focal length f over its entire FOV—desirable for sharp imaging—then the pixels corresponding to larger field angles will never see the same amount of light as the pixels at the center of array 18, due to reduction in the effective size of the aperture. One way to compensate for this effect is to increase the range of field angles mapped to a given pixel as the field angle increases. This is equivalent to changing the focal length of the objective lens system as a function of field angle. Thus, lens system 20 of FIG. 1 may be configured so that its focal length decreases with increasing angle of observation θ relative to a shared optical axis A of the lens system and imaging pixel array. In one limit, a corresponding decrease in focal length can exactly track the fall off in aperture diameter, to maintain a substantially constant, effective aperture size f/N over an extended range of field angles, as shown in FIG. 3D. This approach directs more photons to the high-field pixels, which better utilizes the resolution of the imaging pixel array.

However, the decrease in the focal length need not exactly track the fall off in aperture diameter. The focal length of the lens system may decrease substantially in proportion to a cosine of the angle of observation. More generally, the focal length and an effective aperture diameter of the lens system may decrease by corresponding amounts with increasing angle of observation. Here, the effective aperture diameter is defined as a diameter of a cross section of a physical aperture of the lens system in a plane normal to a line passing between the locus and the imaging pixel array, as shown in FIG. 3A. The corresponding amounts referred to above may differ by one millimeter or less for angles of observation ranging from zero to sixty degrees in some examples. In some embodiments, the resulting ratio of the focal length to the effective aperture diameter of the lens system may be substantially constant for angles of observation ranging from zero to sixty degrees. For example, the ratio may change by less than 5% over this range. In another example, the ratio may change by 1%, or less. The decrease in the focal length directs light of a greater range of observation angles to peripheral pixels of the imaging pixel array, as noted above. In other words, the more peripheral pixels of the imaging pixel array will collect light over a greater range of observation angles than the more centrally located pixels. This is a consequence of the focal length being lower for the range of angles that map to the peripheral pixels.

Figure 4:
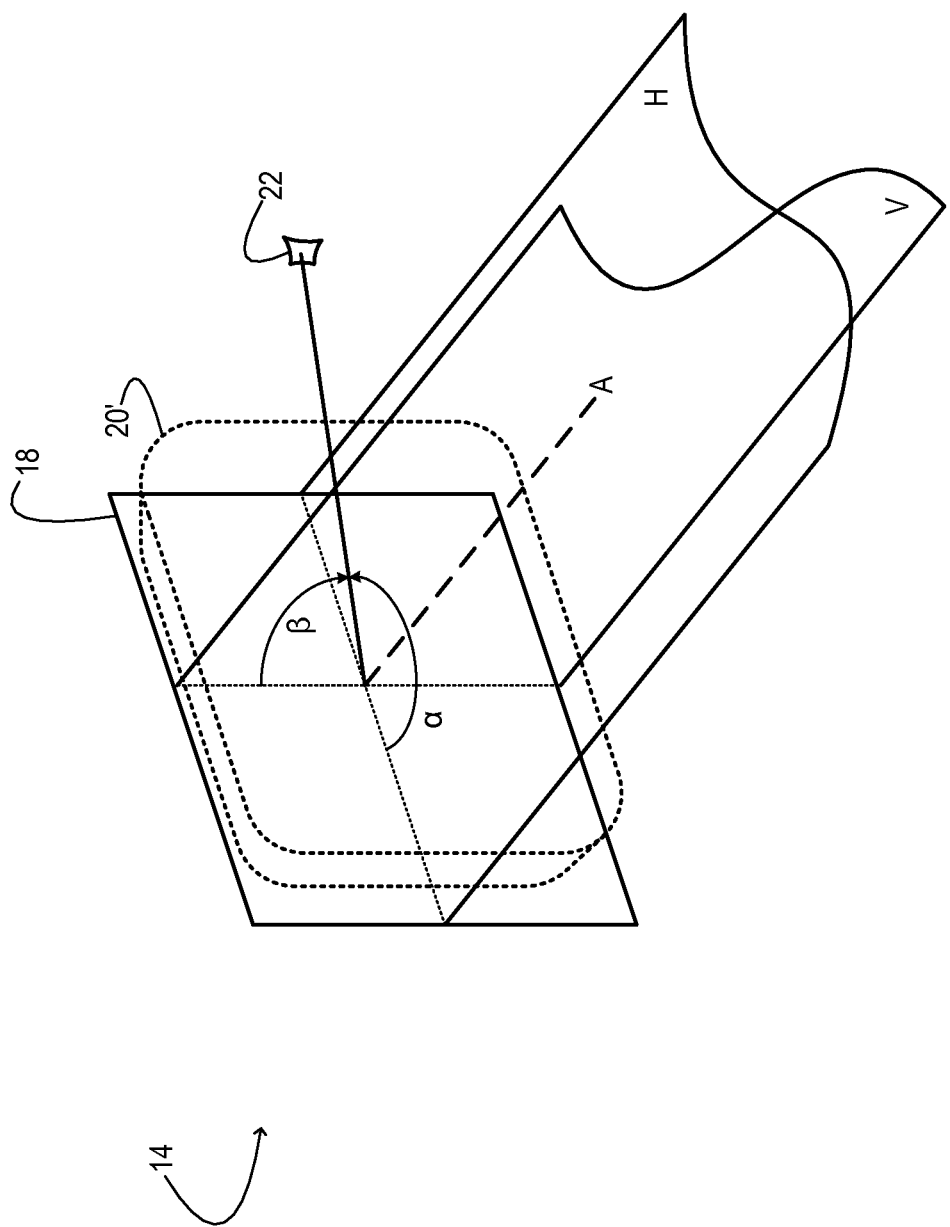
FIG. 4 shows horizontal and vertical observation angles for an example lens system and imaging pixel array.

In some embodiments, lens system 20 may be symmetric about its optical axis A. This need not be the case, however, as a machine vision system can be configured to provide a large field of view along one axis and a relatively small field of view along another axis. When imaging depth in a typical living space, for example, the required horizontal field of view may be larger than the vertical. FIG. 4, accordingly, shows a horizontal angle of observation α in a horizontal plane H orthogonal to imaging pixel array 18 and including the shared optical axis A. The drawing also shows a vertical angle of observation β in a vertical plane V, which is also orthogonal to the imaging pixel array and includes the shared optical axis.

In the embodiment of FIG. 4, lens system 20' admits of two focal-length components—a horizontal focal length for refraction parallel to horizontal plane H, and a vertical focal length for refraction parallel to vertical plane V. Likewise, there are two different effective aperture diameters—a horizontal effective aperture diameter measured in horizontal plane H, and a vertical effective aperture diameter measured in vertical plane V. In this embodiment, the horizontal focal length and horizontal effective aperture diameter of the lens system decrease by corresponding amounts with increasing horizontal angle of observation. Likewise, the vertical focal length and vertical effective aperture diameter of the lens system decrease by corresponding amounts with increasing vertical angle of observation. In this embodiment, the horizontal and vertical focal lengths may differ from each other.

The approaches outlined above effectively convert some of the SZ uncertainty in a time-of-flight measurement into SX and SY uncertainty, thereby balancing the error bars along the three coordinate axes, which makes the acquired 3D image more usable as input data to a computer system. A side effect is increased distortion of the depth image, above the amount typically exhibited by a lens system of constant focal length. In applications where the additional distortion is undesirable, correction can be applied via post processing of the depth image. Accordingly, controller 24 may be configured to map each locus of the subject to corrected (e.g., real-world) coordinates.

Such correction may include converting the apparent (X', Y') from imaging pixel array 18 to a corrected (X, Y) based on a mapping function of objective lens system 20 and imaging pixel array 18. In some embodiments, the mapping may be based on parameters stored in non-volatile memory of controller 24 of machine-vision system 10. The parameters may be determined by a calibration procedure enacted after depth camera 14 and flat-image camera 26 have been fixedly installed in the machine-vision system. In one example calibration procedure, both cameras are triggered to image the same subject—i.e., a calibration standard having a plurality of feature points. Observed feature points in the depth image are mapped to locations where a corresponding feature point is found in the 2D image. It will be noted that the flat-image camera will also include a high-FOV lens system, and therefore may yield a vignetted 2D image. This issue does not compromise the calibration, however, as long as the feature points are identifiable in the 2D image.

In some embodiments, imaging pixel array 18 may include a micro lens array to improve overall light collection efficiency, and to secure other advantages. Here, the F/N parameter of objective lens system 20 may be matched to that of the micro lens array over a wide range of field angles, so that the overall relative illumination down to the pixels of the array remains substantially constant over a corresponding wide range of field angles.

Figure 5A:
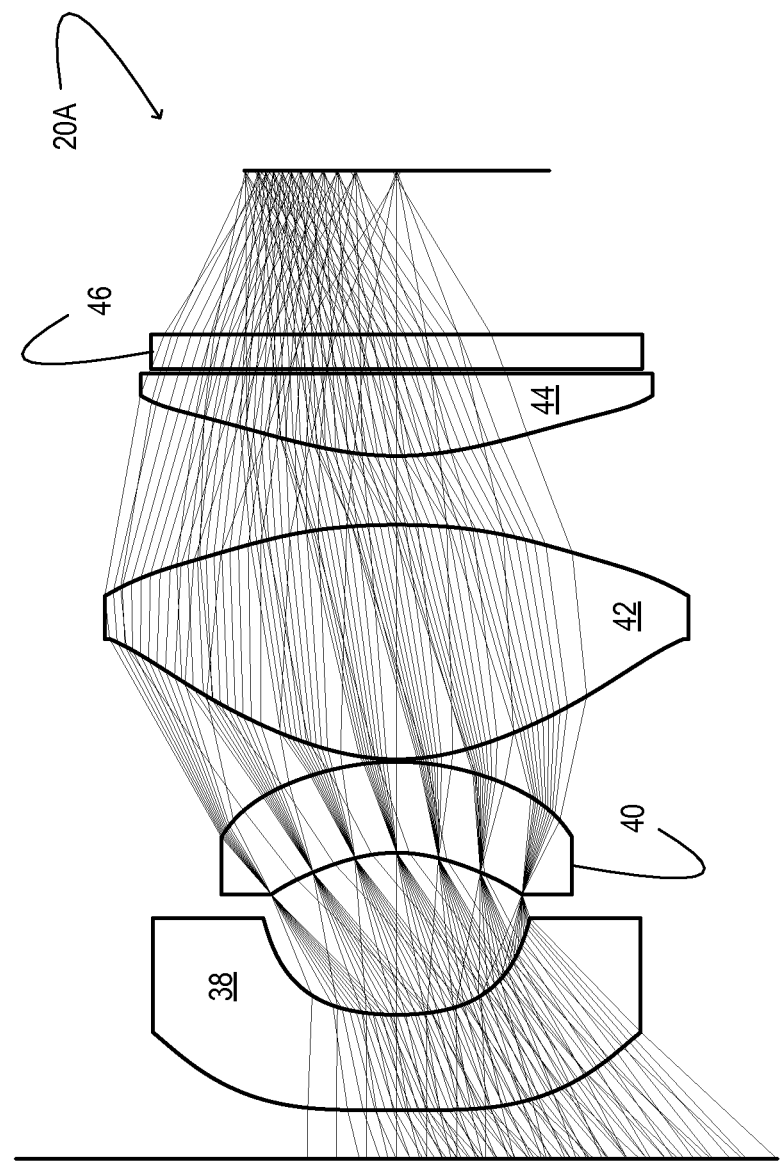
FIGS. 5A, 5B, and 5C show aspects of an example five-element objective lens system with a focal length that tracks effective aperture size over a wide range of field angles.
Figure 5B:
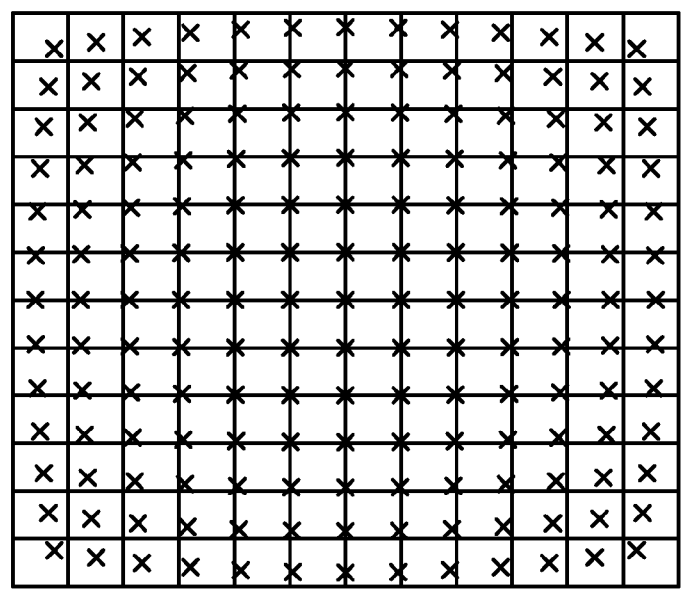
Figure 5C:
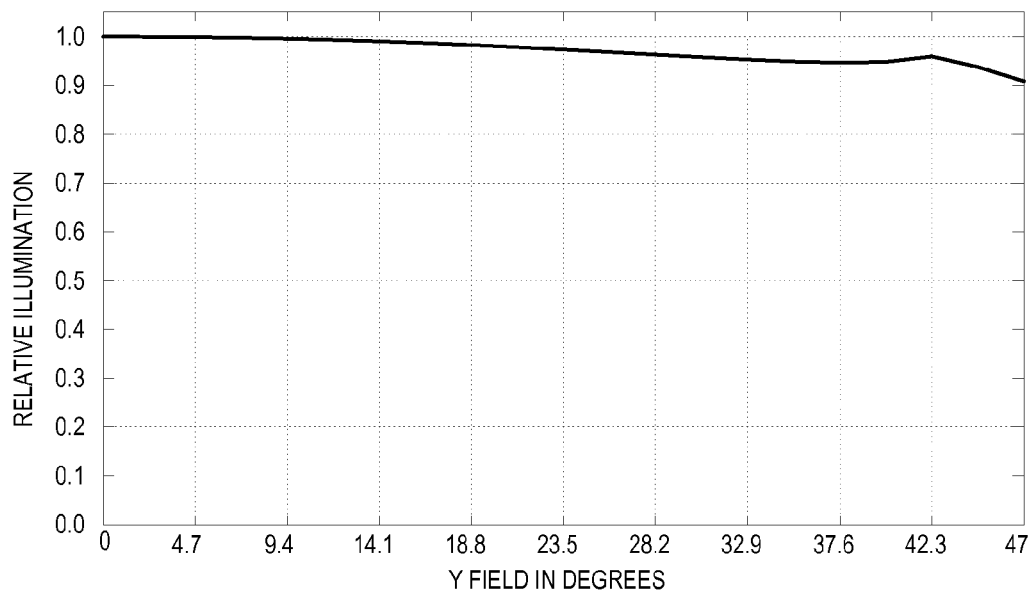

FIG. 5A shows aspects of a more particular five-element objective lens system 20A having a focal length that tracks the effective aperture size over a wide range of field angles. The illustrated lens system includes a meniscus lens 38, another meniscus lens 40 on either side of the aperture stop, a strong bi-convex lens 42, a field lens 44, and an IR cut filter with an IR-sensor lens 46. In one, non-limiting embodiment, the total axial length of the lens system may be 20.186 millimeters (mm). FIG. 5B represents the grid distortion in an image 4.88 mm wide by 4.20 mm high using lens system 20A with 850 nanometer (nm) light over 70 horizontal and 60 vertical degrees of field. In this example, the maximum distortion was −12.6%. FIG. 5C shows that the relative illumination from lens system 20A is 0.9 or greater over 47° of field angle.

Figure 6A:
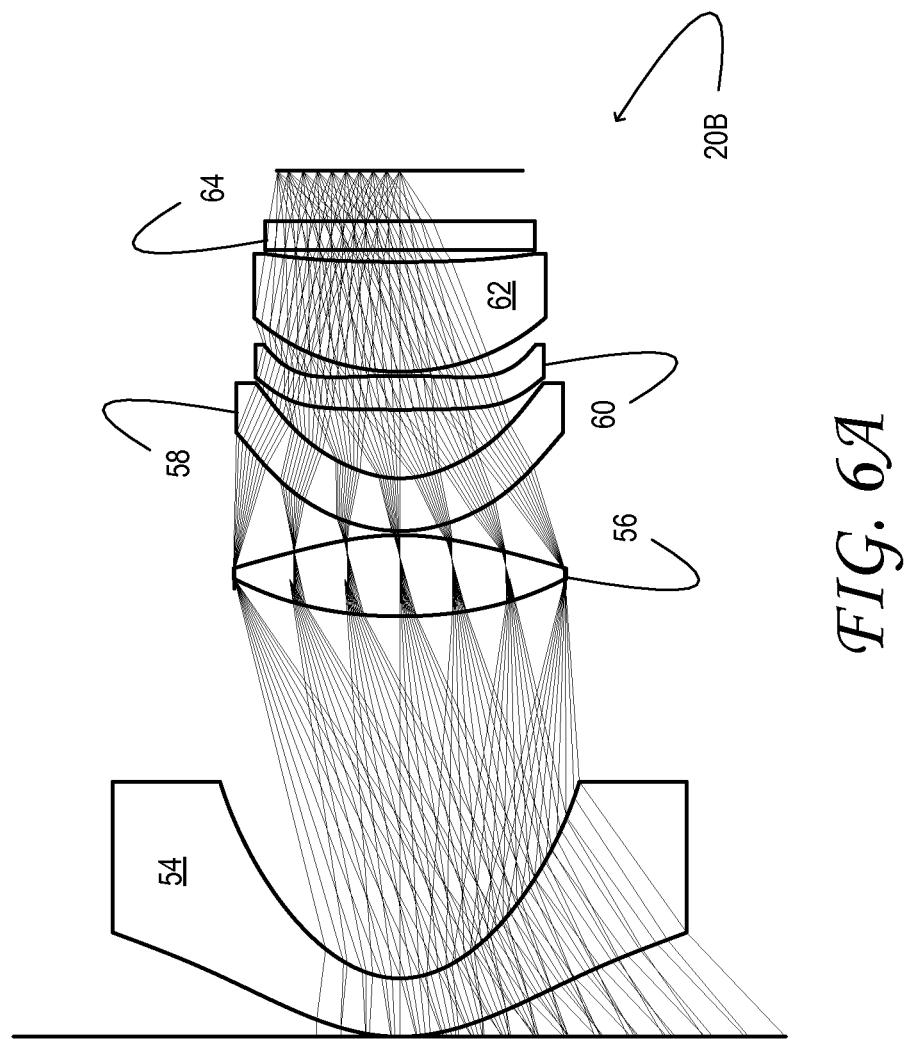
FIGS. 6A, 6B, and 6C show aspects of an example six-element objective lens system with a focal length that tracks effective aperture size over a wide range of field angles.
Figure 6B:
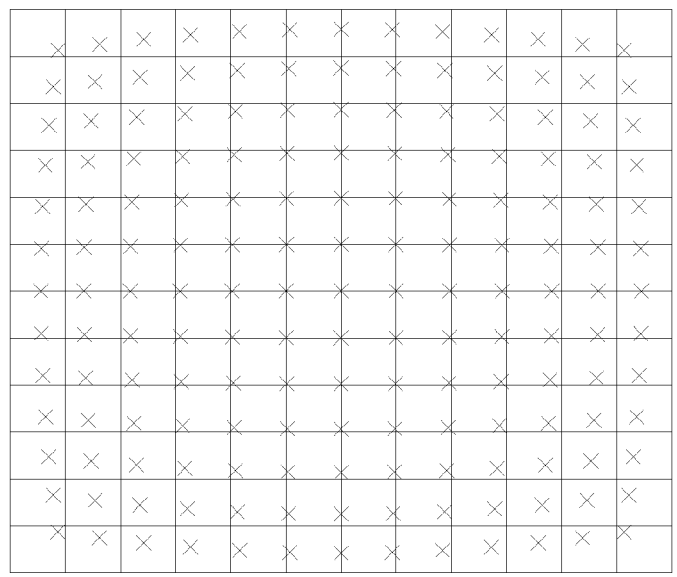
Figure 6C:
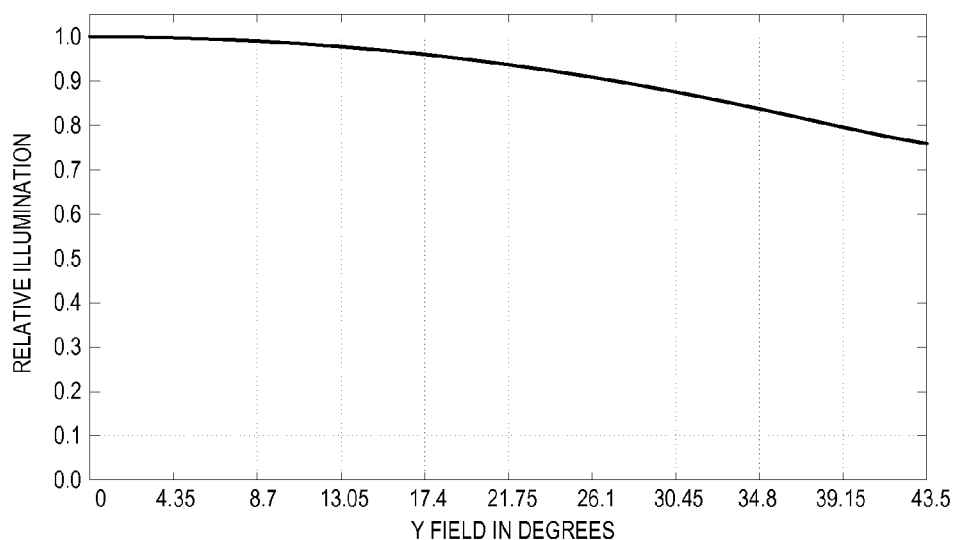

FIG. 6A shows aspects of a more particular six-element objective lens system 20B having a focal length that tracks the effective aperture size over a wide range of field angles. The illustrated lens system includes a wide-FOV meniscus lens 54, a high power biconvex lens 56, a low power meniscus lens 58, a low power meniscus lens 60, a field corrector lens 62, and an IR cut filter 64. In one, non-limiting embodiment, the total axial length of the lens system is 20.747 mm. FIG. 6B represents the grid distortion in an image 5.10 mm wide by 4.33 mm high using lens system 20B with 815 nm light over 70 horizontal and 59.5 vertical degrees of field. In this example, the maximum distortion was −14.5%. FIG. 6C shows that the relative illumination from lens system 20B is 0.76 or greater over 43.5° of field angle.

Figure 7:
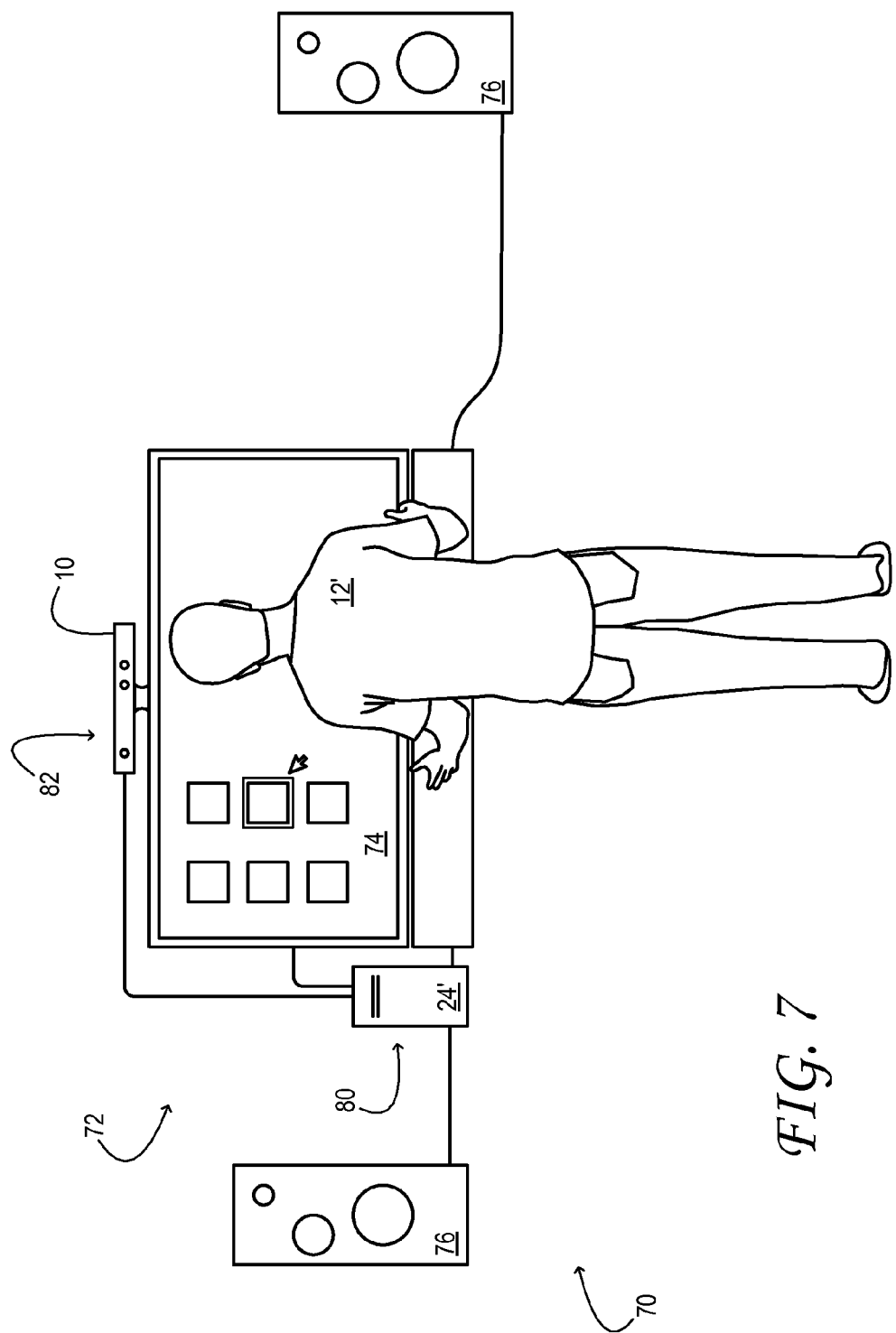
FIG. 7 shows aspects of an example environment in which a machine-vision system may be used.

FIG. 7 shows an example environment 70 in which machine-vision system 10 may be used. The illustrated environment is a living room or family room of a personal residence. However, the approaches described herein are equally applicable in other environments. The environment of FIG. 7 features a home-entertainment system 72 with a large-format display 74 and loudspeakers 76, both operatively coupled to a computer system 24'. Computer system 24' may be a video-game system, a multimedia system, a general-purpose computer system for internet browsing and productivity applications, etc.

Computer system 24' may be configured to accept various forms of user input from one or more users—e.g., human subject 12'. As such, traditional user-input devices such as a keyboard, mouse, touch-screen, gamepad, or joystick controller (not shown in the drawings) may be operatively coupled to the computer system. Regardless of whether traditional user-input modalities are supported, computer system 24' is also configured to accept so-called natural user input (NUI) from at least one user.

To mediate NUI from the one or more users, computer system 24' includes NUI system 80. The NUI system is configured to capture various aspects of the NUI and provide corresponding actionable input to the computer system. To this end, the NUI system receives low-level input from peripheral sensory components, which include machine-vision system 10 and listening system 82. Although FIG. 7 shows the sensory components arranged atop display 74, various other arrangements are contemplated as well. The machine-vision system could be mounted on a ceiling, for example.

Figure 8:
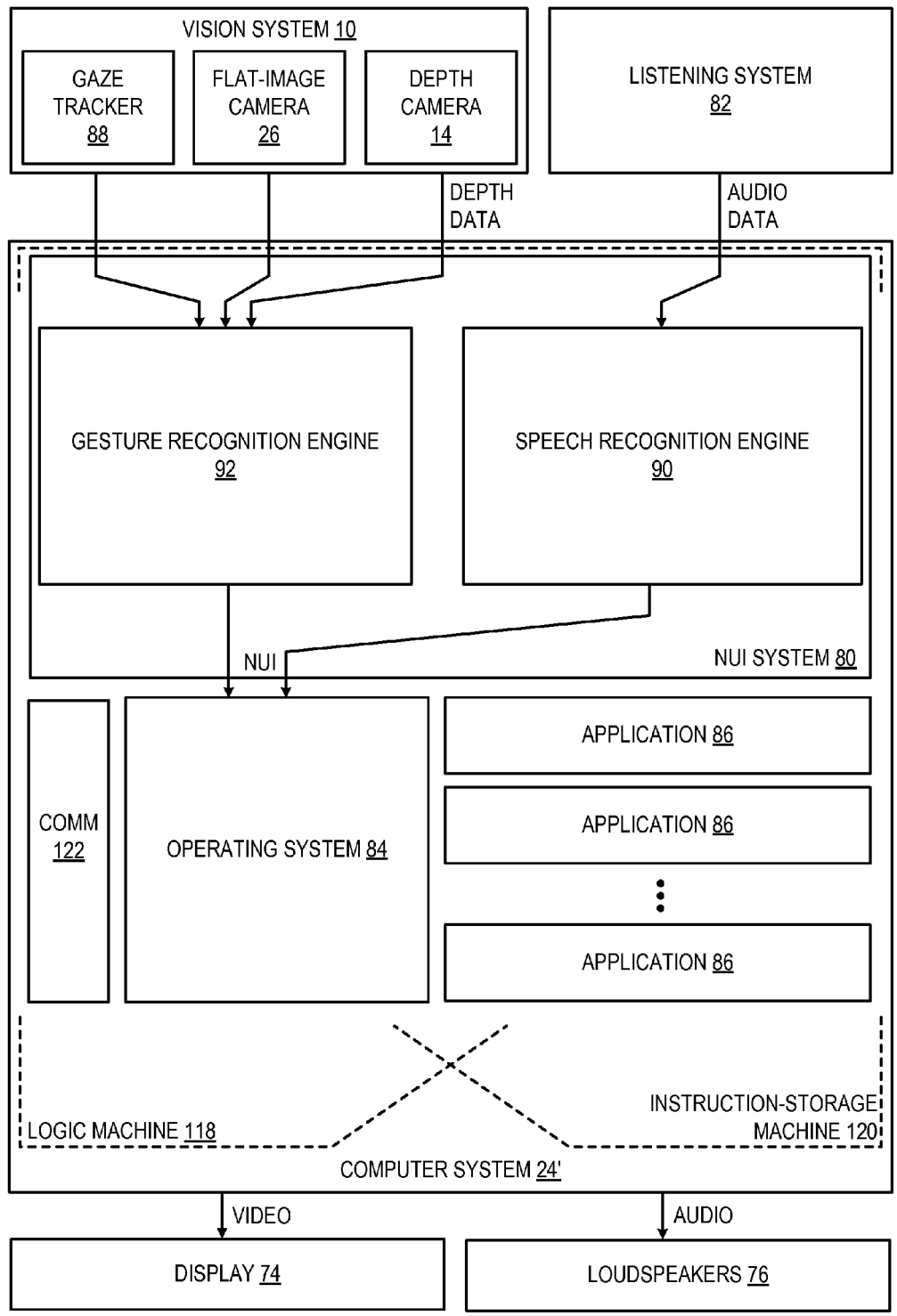
FIG. 8 is a high-level schematic diagram showing aspects of an example computer system, natural user-input (NUI) system, machine-vision system, and listening system.

FIG. 8 is a high-level schematic diagram showing aspects of computer system 24', NUI system 80, machine-vision system 10, and listening system 82, in one example embodiment. The illustrated computer system includes operating system (OS) 84, which may be instantiated in software and/or firmware of the computer system. The computer system as illustrated is configured to execute one or more applications 86, such as a video-game application, a digital-media player, an internet browser, a photo editor, a word processor, and/or a spreadsheet application, for example. Naturally, the computer, NUI, vision, and/or listening systems may include suitable data-storage, instruction-storage, and logic hardware, as needed to support their respective functions.

Listening system 82 may include one or more microphones to pick up vocalization and other audible input from one or more users and other sources in environment 70; machine-vision system 10 detects visual input from the users. In the illustrated embodiment, the machine-vision system includes one or more depth cameras 14, one or more flat-image cameras 26, and a gaze tracker 88. In other embodiments, the machine-vision system may include more or fewer components. NUI system 80 processes low-level input (i.e., signal) from these sensory components to provide actionable, high-level input to computer system 24'.

As shown in FIG. 8, NUI system 80 includes a speech-recognition engine 90 and a gesture-recognition engine 92. The speech-recognition engine may be configured to process the audio data from listening system 82, to recognize certain words or phrases in the user's speech, and to generate corresponding actionable input to OS 84 or applications 86 of computer system 24'. The gesture-recognition engine is configured to process at least the depth data from machine-vision system 10, to identify one or more human subjects in the depth data, to compute various geometric (e.g., skeletal) features of the subjects identified, and to gather from the geometric features the various postural or gestural information to be used as NUI to the OS or applications. To this end, depth-image data including distance to each the locus of the subject is provided as input to the gesture recognition engine. Functions of the gesture-recognition engine are described hereinafter in greater detail.

The configurations described above enable various methods to provide NUI to computer system 24'. Accordingly, some such methods are now described, by way of example, with continued reference to the above configurations. It will be understood, however, that the methods here described, and others equally within the scope of this disclosure, may be enabled by other configurations as well.

Figure 9:
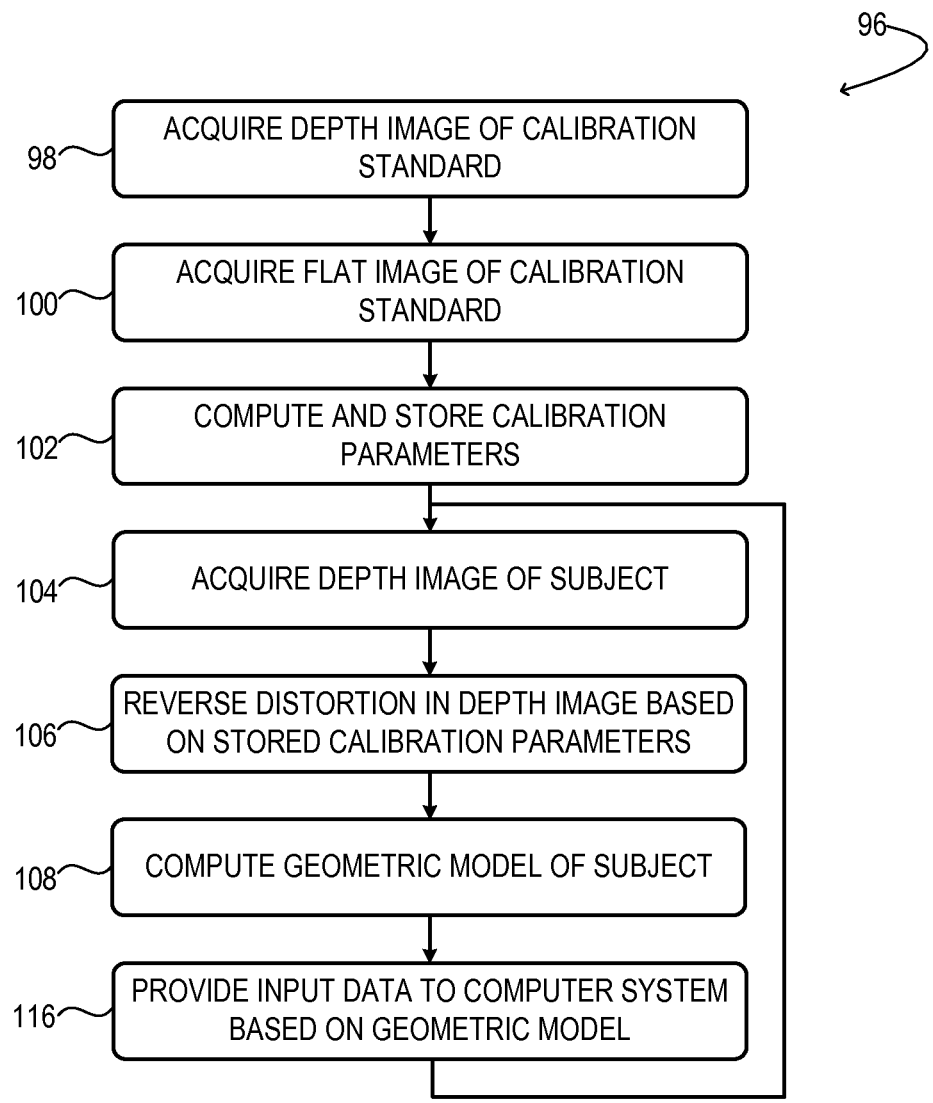
FIG. 9 illustrates an example method to provide NUI to a computer system.

FIG. 9 illustrates an example method 96 to provide NUI to a computer system. The first portion of the method is a calibration subroutine, which may be enacted at the facility where machine-vision system 10 is manufactured. Alternatively, the calibration subroutine may be enacted during servicing of the machine-vision system, or even in the field.

At 98 of method 96, a depth image of a calibration standard is acquired via depth camera 14. The calibration standard may be a substantially flat surface of such size and positioned at such distance as to fill an entire FOV of the depth camera. In some examples, the calibration standard may include regularly spaced feature points, such as a grid or checkerboard. At 100, a flat image of the same calibration standard is acquired by flat-image camera 26, which has a substantially fixed focal length lens, and is not subject to the additional distortion of depth camera 14 resulting from its variable focal length. At 102, calibration parameters relating the FOV of depth camera 14 to that of the flat-image camera are computed and stored in non-volatile memory of controller 24.

The balance of method 96 is a primary routine for providing NUI to a computer system, such as computer system 24'. At 104, a depth image of the subject is acquired via depth camera 14, which is equipped with a high FOV objective lens system 20 as described above. At 106 the distortion imparted to the depth image by that lens system is reversed based on the calibration parameters stored in the non-volatile memory.

At 108 of method 96, a geometric model of the subject is computed based on the corrected depth image, which includes high quality image content at high field angles. In one non-limiting embodiment, at least a portion of one or more human subjects may be identified in the depth data by NUI system 80. Through appropriate depth-image processing, a given locus of a depth map may be recognized as belonging to a human subject. In a more particular embodiment, pixels that belong to a human subject may be identified by sectioning off a portion of the depth data that exhibits above-threshold motion over a suitable time scale, and attempting to fit that section to a generalized geometric model of a human being. If a suitable fit can be achieved, then the pixels in that section are recognized as those of a human subject.

In one, non-limiting example, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Person indices may be determined, assigned, and saved in any suitable manner.

After all the candidate human subjects are identified in the fields of view (FOVs) of each of the connected depth cameras, NUI system 80 may make the determination as to which human subject (or subjects) will provide user input to computer system 24'—i.e., which will be identified as a user. In some embodiments, a human subject may be selected as a user based on proximity to display 74 or depth camera 14, and/or position in a field of view of a depth camera. More specifically, the user selected may be the human subject closest to the depth camera or nearest the center of the FOV of the depth camera.

After one or more users are identified, NUI system 80 may begin to process posture information from such users. The posture information may be derived computationally from depth video acquired with depth camera 14. At this stage of execution, additional sensory input—e.g., image data from a flat-image camera 26 or audio data from listening system 82—may be processed along with the posture information.

In some embodiments, NUI system 80 may be configured to analyze the pixels of a depth map that correspond to a user, in order to determine to what part of the user's body each pixel corresponds. A variety of different body-part assignment techniques can be used to this end. In one example, each pixel of the depth map with an appropriate person index (vide supra) may be assigned a body-part index. The body-part index may include a discrete identifier, confidence value, and/or body-part probability distribution indicating the body part or parts to which that pixel is likely to correspond.

In one example, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses; trainers provide ground truth annotations labeling various machine-learning classifiers in the observed data. The observed data and annotations are then used to generate one or more machine-learned algorithms that map inputs (e.g., observation data from a depth camera) to desired outputs (e.g., body-part indices for relevant pixels).

Figure 10:
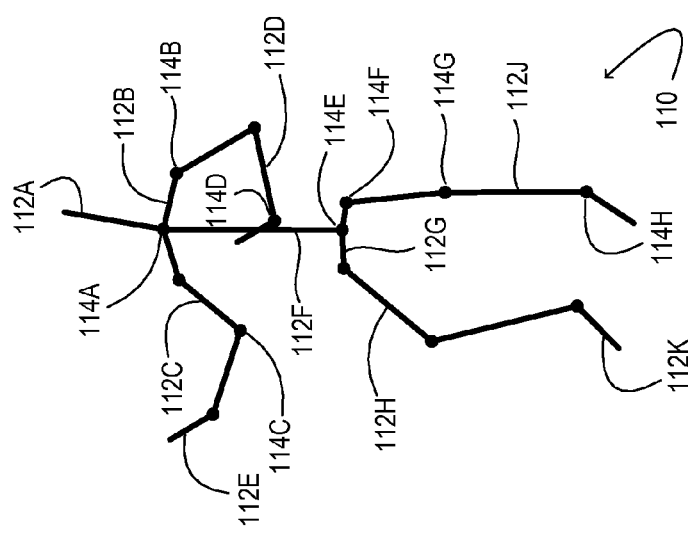
FIG. 10 shows aspects of an example virtual skeleton generated by an NUI system operatively coupled to a machine-vision system.

Thereafter, a virtual skeleton is fit to at least one human subject identified. In some embodiments, a virtual skeleton is fit to the pixels of depth data that correspond to a user. FIG. 10 shows an example virtual skeleton 110 in some embodiments. The virtual skeleton includes a plurality of skeletal segments 112 pivotally coupled at a plurality of joints 114. In some embodiments, a body-part designation may be assigned to each skeletal segment and/or each joint. In FIG. 10, the body-part designation of each skeletal segment 112 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 114 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 10 is in no way limiting. A virtual skeleton consistent with this disclosure may include virtually any type and number of skeletal segments and joints.

In some embodiments, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. In this manner, the metrical data defining the virtual skeleton—its size, shape, and position and orientation relative to the depth camera may be assigned to the joints.

Via any suitable minimization approach, the lengths of the skeletal segments and the positions and rotational angles of the joints may be adjusted for agreement with the various contours of the depth map. This process may define the location and posture of the imaged human subject. Some skeletal-fitting algorithms may use the depth data in combination with other information, such as color-image data and/or kinetic data indicating how one locus of pixels moves with respect to another.

In some embodiments, a virtual skeleton may be fit to each of a sequence of frames of depth video. By analyzing positional change in the various skeletal joints and/or segments, the corresponding movements—e.g., gestures, actions, or behavior patterns—of the imaged user may be determined. In this manner, the posture or gesture of the one or more human subjects may be detected in NUI system 80 based on one or more virtual skeletons.

The foregoing description should not be construed to limit the range of approaches usable to construct a virtual skeleton, for a virtual skeleton may be derived from a depth map in any suitable manner without departing from the scope of this disclosure. Moreover, despite the advantages of using a virtual skeleton to model a human subject, this aspect is by no means necessary. In lieu of a virtual skeleton, raw point-cloud data may be used directly to provide suitable posture information.

Figure 11:
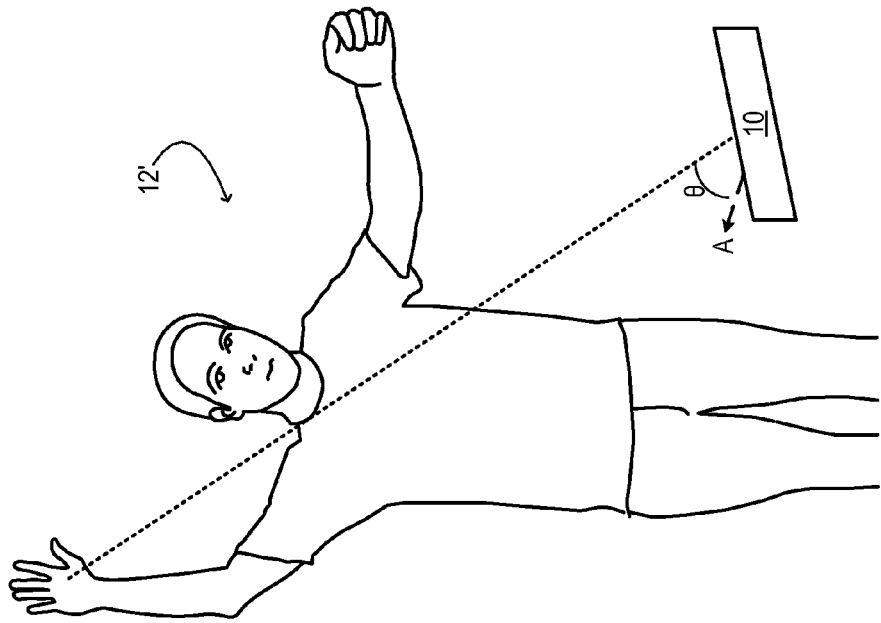
FIG. 11 shows aspects of an example gesture used as NUI to a computer system.

Returning to FIG. 9, at 116, NUI data based on the geometric model is provided to computer system 24'. Such input data may include posture data or gesture data of one or more human subjects cited by the machine-vision system. A representative gesture is shown in FIG. 11, where the subject's hand is positioned at a high angle θ with respect to the optical axis A of machine-vision system 10. Such gestures may include input to launch a process, change a setting of the OS, shift input focus from one process to another, or provide virtually any control function in computer system 24'.

As evident from the foregoing description, the methods and processes described herein may be tied to a computing system of one or more computing devices. Such methods and processes may be implemented as a computer-application program or service, an application-programming interface (API), a library, and/or other computer-program product.

FIGS. 1 and 8 show aspects of controller 24 and computer system 24'—compute systems configured to support the methods and processes described herein. Each compute system includes a logic machine 118 and an instruction-storage (or memory) machine 120. Each compute system may optionally include a display subsystem, an input subsystem, a communication subsystem, and other components not shown in the drawings.

Logic machines 118 include one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machines 118 may include one or more processors configured to execute software instructions. Additionally or alternatively, a logic machine may include one or more hardware or firmware logic machines configured to execute hardware or firmware instructions. Processors of the logic machines may be single-core or multi-core, and the instructions executed thereon may be configured for sequential, parallel, and/or distributed processing. Individual components of the logic machines optionally may be distributed among two or more separate devices, which may be remotely located and/or configured for coordinated processing. Aspects of a logic machine may be virtualized and executed by remotely accessible, networked computing devices configured in a cloud-computing configuration.

Instruction-storage machines 120 include one or more physical devices configured to hold instructions executable by an associated logic machine 118 to implement the methods and processes described herein. When such methods and processes are implemented, the state of the instruction-storage machine may be transformed—e.g., to hold different data. An instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices.

It will be appreciated that each instruction-storage machine 120 includes one or more physical devices. However, aspects of the instructions described herein alternatively may be propagated by a communication medium (e.g., an electromagnetic signal, an optical signal, etc.) that is not stored via a storage medium.

Aspects of logic machines 118 and instruction-storage machines 120 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, a display subsystem may be used to present a visual representation of data held by an associated instruction-storage machine 120. This visual representation may take the form of a graphical user interface (GUI). As the herein described methods and processes change the data held by the storage machine, and thus transform the state of the storage machine, the state of the display subsystem may likewise be transformed to visually represent changes in the underlying data. A display subsystem may include one or more display devices utilizing virtually any type of technology. Such display devices may be combined with a logic machine 118 and/or instruction-storage machine 120 in a shared enclosure, or such display devices may be peripheral display devices.

When included, an input subsystem may comprise or interface with one or more user-input devices such as a keyboard, mouse, touch screen, or game controller. In some embodiments, an input subsystem may comprise or interface with selected natural user-input componentry. Such componentry may be integrated or peripheral, and the transduction and/or processing of input actions may be handled on- or off-board.

When included, a communication subsystem 122 may be configured to communicatively couple a compute system with one or more other compute systems. A communication subsystem may include wired and/or wireless communication devices compatible with one or more different communication protocols. As non-limiting examples, a communication subsystem may be configured for communication via a wireless telephone network, or a wired or wireless local- or wide-area network. In some embodiments, the communication subsystem may allow a compute system to send and/or receive messages to and/or from other devices via a network, such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A machine-vision system comprising:
 a modulated light source configured to project light onto a subject;
 an imaging pixel array configured to receive the light reflected from a locus of the subject and indicate distance to the locus; and
 a lens system configured to have a focal length that decreases with increasing angle of observation of the locus relative to a shared optical axis of the lens system and the imaging pixel array, the lens system configured to receive the light reflected from the locus and refract such light onto the imaging pixel array, wherein a ratio of the focal length to the effective aperture diameter of the lens system is substantially constant for angles of observation ranging from zero to sixty degrees.

2. The machine-vision system of claim 1 wherein the lens system is configured such that the focal length decreases substantially in proportion to a cosine of the angle of observation.

3. The machine-vision system of claim 1 wherein the angle of observation is a horizontal angle in a horizontal plane orthogonal to the imaging pixel array and including the shared optical axis, wherein the focal length is a horizontal focal length for refraction parallel to the horizontal plane, wherein the effective aperture diameter is a horizontal diameter measured in the horizontal plane, and wherein a vertical focal length and vertical effective aperture diameter of the lens system decrease by corresponding amounts with increasing vertical angle of observation, the vertical angle of observation being a vertical angle in a vertical plane orthogonal to the imaging pixel array and including the shared optical axis, the vertical focal length being a focal length for refraction parallel to the vertical plane, the vertical effective aperture diameter being measured in the vertical plane, and the horizontal and vertical focal lengths differing from each other.

4. The machine-vision system of claim 1 wherein a ratio of the focal length to the effective aperture diameter of the lens system is substantially constant for angles of observation ranging from zero to sixty degrees.

5. The machine-vision system of claim 1 wherein the shared optical axis is normal to the imaging pixel array and passes through a center of the lens system.

6. The machine-vision system of claim 1 further comprising a controller operatively coupled to the modulated light source and to the imaging pixel array and configured to compute the distance to the locus.

7. The machine-vision system of claim 6 wherein the controller is further configured to modulate the light source and synchronously address the imaging pixel array.

8. The machine-vision system of claim 1 wherein the lens system is a compound lens system.

9. The machine-vision system of claim 1 wherein the distance to the locus is output to a computer system configured to compute a geometric model of the subject.

10. The machine-vision system of claim 1 wherein a central pixel of the imaging pixel array collects light over a first range of observation angles, and a peripheral pixel of the imaging pixel array collects light over a second, greater range of observation angles.

11. The machine-vision system of claim 1 wherein the modulated light source is a spatially modulated light source, and wherein the imaging pixel array indicates distance to the locus by revealing distance between adjacent illuminated areas of the subject.

12. The machine-vision system of claim 1 wherein the lens system refracts in an infrared or near-infrared wavelength band, and wherein the modulated light source emits in the infrared or near-infrared wavelength band.

13. A machine-vision system comprising:
a modulated light source configured to project light onto a subject;
an imaging pixel array configured to receive the light reflected from a locus of the subject and indicate distance to the locus;
a lens system whose focal length decreases with increasing angle of observation of the locus relative to a shared optical axis of the lens system and the imaging pixel array, the lens system configured to receive the light reflected from the locus and refract such light onto the imaging pixel array, wherein a ratio of the focal length to the effective aperture diameter of the lens system is substantially constant for angles of observation ranging from zero to sixty degrees; and
a controller operatively coupled to the modulated light source and to the imaging pixel array, the controller configured to compute the distance to the locus and map the locus to real-world coordinates.

14. The machine-vision system of claim 13 wherein each pixel of the imaging pixel array is mapped to corresponding real-world coordinates using a calibration matrix stored in non-volatile memory of the machine-vision system.

15. The machine-vision system of claim 14 further comprising a flat-image camera with an optical axis fixedly related to the shared optical axis of the lens system and imaging pixel array, wherein the calibration matrix is stored in the non-volatile memory on completion of a calibration procedure where both the imaging pixel array and the flat-image camera image the same subject.

16. The machine-vision system of claim 15 wherein the flat-image camera is a fixed focal-length color camera.

17. A time-of-flight machine-vision system comprising:
a temporally modulated light source configured to project light onto a subject;
an imaging pixel array configured to receive the light reflected from a locus of the subject and indicate distance to the locus; and
a compound lens system configured to receive the light reflected from the locus and refract such light onto the imaging pixel array, the compound lens system having a physical aperture and an effective aperture, the effective aperture being a cross section of the physical aperture in a plane normal to a line-of-sight passing between the locus and the imaging pixel array, a diameter of the effective aperture and a focal length of the lens system decreasing by corresponding amounts with increasing angle of observation relative to a shared optical axis of the lens system and the imaging pixel array, wherein the corresponding amounts differ by one millimeter or less for angles of observation ranging from zero to sixty degrees.

18. The time-of-flight machine-vision system of claim 17 wherein the lens system includes five to six refractive elements.

19. The machine-vision system of claim 1 wherein the focal length and an effective aperture diameter of the lens system decrease by corresponding amounts with increasing angle of observation, the effective aperture diameter being defined as a diameter of a cross section of a physical aperture of the lens system in a plane normal to a line-of-sight passing between the locus and the imaging pixel array.

20. The machine-vision system of claim 13 wherein the focal length and an effective aperture diameter of the lens system decrease by corresponding amounts with increasing angle of observation, the effective aperture diameter being defined as a diameter of a cross section of a physical aperture of the lens system in a plane normal to a line-of-sight passing between the locus and the imaging pixel array.

* * * * *